(12) United States Patent
Bordács

(10) Patent No.: US 8,544,491 B2
(45) Date of Patent: Oct. 1, 2013

(54) COMPRESSED AIR SUPPLY SYSTEM FOR A COMMERCIAL VEHICLE, AND METHOD FOR OPERATING A COMPRESSED AIR SUPPLY SYSTEM

(75) Inventor: Zoltán Bordács, Veszprém (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 1048 days.

(21) Appl. No.: 12/562,547

(22) Filed: Sep. 18, 2009

(65) Prior Publication Data

US 2010/0071779 A1 Mar. 25, 2010

Related U.S. Application Data

(63) Continuation of application No. PCT/EP2008/002128, filed on Mar. 18, 2008.

(30) Foreign Application Priority Data

Mar. 19, 2007 (DE) .......................... 10 2007 013 671

(51) Int. Cl.

| F16K 11/22 | (2006.01) |
|---|---|
| F16K 11/24 | (2006.01) |
| B60T 17/04 | (2006.01) |
| B60T 13/68 | (2006.01) |
| B60T 13/70 | (2006.01) |

(52) U.S. Cl.
USPC ................... 137/115.25; 137/544; 251/30.01; 303/15

(58) Field of Classification Search
USPC ................... 137/563, 115.04, 115.07, 115.25, 137/597, 544; 251/30.01; 303/15, 16
See application file for complete search history.

(56) References Cited

U.S. PATENT DOCUMENTS

| 2005/0017474 A1* | 1/2005 | Heer .......................... 280/124.16 |
| 2006/0244305 A1* | 11/2006 | Hilberer .......................... 303/15 |
| 2007/0096554 A1* | 5/2007 | Detlefs et al. .................. 303/127 |

FOREIGN PATENT DOCUMENTS

| DE | 103 23 037 A1 | 12/2004 |
| DE | 10 2005 057 004 B3 | 4/2007 |
| EP | 1 318 936 B1 | 6/2006 |

OTHER PUBLICATIONS

International Search Report dated Jul. 23, 2008 (four (4) pages).
German Search Report dated Oct. 16, 2008 with English translation (eight (8) pages).

* cited by examiner

*Primary Examiner* — Craig Schneider
*Assistant Examiner* — Atif Chaudry
(74) *Attorney, Agent, or Firm* — Crowell & Moring LLP

(57) ABSTRACT

A compressed air supply system for a commercial vehicle includes a compressed air inlet that can be coupled to a compressor, a filter unit that is coupled to the compressed air inlet via a delivery line, a discharge valve unit that is coupled to a discharge outlet and the delivery line, an energy saving control output that can be coupled to a control input of the compressor, a first valve unit and a second valve unit, wherein the discharge value unit, the energy saving control output, and the regeneration of the filter unit can be controlled via the value units. A first control input of the discharge value unit, the energy saving control output and the regeneration of the filter unit can be controlled via the first value unit. A second control input of the discharge value unit can be controlled via the second value unit. A method is provided for operating the compressed air supply system.

36 Claims, 5 Drawing Sheets

US 8,544,491 B2

COMPRESSED AIR SUPPLY SYSTEM FOR A COMMERCIAL VEHICLE, AND METHOD FOR OPERATING A COMPRESSED AIR SUPPLY SYSTEM

CROSS REFERENCE TO RELATED APPLICATIONS

This application is a continuation of PCT International Application No. PCT/EP2008/002128, filed Mar. 18, 2008, which claims priority under 35 U.S.C. §119 to German Patent Application No. 10 2007 013 671.6, filed Mar. 19, 2007, the entire disclosures of which are herein expressly incorporated by reference.

This application contains subject matter related to U.S. application Ser. No. 12/562,810, now U.S. Pat. No. 8,297,297, issued Oct. 30, 2012, entitled "Compressed Air Supply System for a Commercial Vehicle and Method for Operating a Compressed Air Supply System," and U.S. application Ser. No. 12/562,851, entitled "Compressed Air Supply System for a Commercial Vehicle and Method for Operating Said Compressed Air Supply System," both filed on even date herewith.

BACKGROUND AND SUMMARY OF THE INVENTION

The invention relates to a compressed air supply system for a commercial vehicle having a compressed air inlet that can be coupled to a compressor, a filter module coupled to the compressed air inlet via a delivery line, a discharge valve coupled to a discharge outlet and the delivery line, an energy-saving control outlet that can be coupled to a control inlet of the compressor, and a first valve unit together with a second valve unit, the valve units serving to control the discharge valve, the energy-saving control outlet and the regeneration of the filter module.

The invention further relates to a method for operating a compressed air supply system having a compressed air inlet that can be coupled to a compressor, a filter module coupled to the compressed air inlet via a delivery line, a discharge valve coupled to a discharge outlet and the delivery line, an energy-saving control outlet that can be coupled to a control inlet of the compressor, and a first valve unit together with a second valve unit, the valve units serving to control the discharge valve, the energy-saving control outlet and the regeneration of the filter module.

Such compressed air supply systems fulfill numerous functions in commercial vehicles. These include, in particular, the supply of dry, purified compressed air to the braking system and other compressed air consumers, the exercise of a multi-circuit safety valve function to safeguard various consumer circuits and to ensure a specific filling order and the provision of a pressure regulator function. The compressed air used by the compressed air consumers is provided primarily by a compressor, which is generally driven by the internal combustion engine of the commercial vehicle. In many systems the compressor can be brought into an energy-saving state, either by separating a clutch, which serves to couple the compressor to the internal combustion engine, or by pneumatic actuation of a compressor control inlet, in order to bring the compressor into an idling state. Such energy-saving measures may be further supported in that the operating sequences in the compressed air supply system, as far as possible, take place in such a way that compressed air, once generated, does not needlessly go to waste.

It should be noted here that a certain compressed air loss is unavoidable, since the filter module of the compressed air supply system has to be repeatedly regenerated. For this purpose, dry compressed air is fed from the compressed air reservoirs connected to the compressed air supply system through the filter module in a direction opposed to the delivery direction. The air flowing through the filter module at least partially absorbs the moisture in the filter unit before flowing out into the open via the discharge valve of the compressed air supply system.

EP 1 318 936 B1 describes a compressed air supply system, which is equipped with a regeneration function and an energy-saving outlet for bringing a compressor into an idling state. Provision is made for two solenoid valves, which perform these functions. The intention here is to link the opening of the regeneration air path to the opening of the discharge valve. In this way the compressed air is lost from the volume between the discharge valve and a non-return valve, arranged downstream of the filter module and facing the consumers, only when this is unavoidable due to the regeneration required.

In other systems in the state of the art, the energy-saving state is linked to the opening of the discharge valve, that is to say whenever the compressor is brought into an energy-saving state the discharge valve is also opened. In the absence of any countermeasures, this results in an unnecessary pressure loss over the entire delivery line upstream of a non-return valve, which faces the consumers and is arranged downstream of the filter module.

The object of the invention is to provide a compressed air supply system and a method of operation affording a high potential energy saving and an increase in the functionality compared to the state of the art.

This object is achieved by a compressed air supply system for a commercial vehicle having a compressed air inlet that can be coupled to a compressor, a filter module coupled to the compressed air inlet via a delivery line, a discharge valve unit coupled to a discharge outlet and the delivery line, an energy-saving control outlet that can be coupled to a control inlet of the compressor, and a first valve unit together with a second valve unit. The valve units serve to control the discharge valve unit, the energy-saving control outlet and the regeneration of the filter module. The first valve unit serves to control a first control inlet of the discharge valve unit, the energy-saving control outlet and the regeneration of the filter module. The second valve unit serves to control a second control inlet of the discharge valve unit.

Advantageous embodiments of the invention are described herein.

The invention is based on a compressed air supply system, in which the first valve unit serves to control a first control inlet of the discharge valve unit, the energy-saving control outlet and the regeneration of the filter module, and the second valve unit serves to control a second control inlet of the discharge valve unit. The compressed air supply system can therefore be regenerated solely by switching over the first valve unit, since both the regeneration air path and the discharge valve can be opened by switching over the first valve unit. At the same time by switching over the first valve unit the compressor connected to the energy-saving control outlet is switched over into an idling state or an operating state with reduced energy consumption. In order to be able to bring about this idling state of the compressor even when regeneration is not desired or necessary, however, the discharge valve unit has a second control inlet, which can be actuated by the second valve unit. The discharge valve can thereby be kept closed even when the first control inlet of the discharge valve is being ventilated.

The first valve unit usefully evacuates the first control inlet of the discharge valve unit in a first switching state and ventilates the first control inlet of the discharge valve unit in a second switching state, and the discharge valve unit is brought into an opened state by ventilation of the first control inlet when the second control inlet is evacuated. If neither the first nor the second control inlet of the discharge valve is ventilated, the second control inlet is closed. If the second control inlet remains evacuated, whilst the first control inlet is ventilated, the discharge valve can be opened.

In particular, the second valve unit evacuates the second control inlet of the discharge valve unit in a first switching state and ventilates the second control inlet of the discharge valve unit in a second switching state, and the discharge valve unit is closed when the second control inlet is ventilated, even when the first control inlet is ventilated. This means that the second control inlet of the discharge valve has priority over the first control inlet. If the same pressures prevail on both control inlets, the ventilation of the first control inlet has no effect. This can be achieved in that the force developed by the ventilation of the second control inlet is assisted by a spring or in that the control inlets have different effective pressure areas so that, given identical pressures, different forces act on a control element of the discharge valve.

Providing two valve units, each having two switching states, means that in total four possible operating states are available, whereby in a first operating state of the compressed air supply system the first valve unit assumes its first switching state and the second valve unit assumes its first switching state, so that a first delivery operating state prevails. The regeneration air path is closed, the compressor is in its delivery phase and the discharge valve is closed.

Furthermore, in a second operating state of the compressed air supply system, the first valve unit assumes its first switching state and the second valve unit assumes its second switching state, so that a second delivery operating state prevails. The regeneration air path is closed, the compressor is in its delivery phase and the discharge valve is closed. In contrast to the first delivery operating state, in the second delivery operating state, the second control inlet, which was evacuated in the first delivery operating state, is ventilated. This does not lead to a change in the switching state of the discharge valve unit, since the discharge valve unit assumes its closed state even when the control inlets are evacuated.

Furthermore, in a third operating state of the compressed air supply system, the first valve unit assumes its second switching state and the second valve unit assumes its first switching state, so that a regeneration operating state prevails. The regeneration air path is opened, the discharge valve is opened and the compressor is in its idling phase.

Furthermore, in a fourth operating state of the compressed air supply system, the first valve unit assumes its second switching state and the second valve unit assumes its second switching state, so that a closed operating state prevails. Irrespective of whether the regeneration air path is opened or closed in the fourth operating state, the discharge valve is in any case in its closed state due to the ventilated second control inlet. Consequently any outflow of compressed air from the system through the discharge valve is blocked, that is to say, in particular, even when the regeneration air path is opened.

According to a preferred embodiment of the present invention, the first valve unit is arranged in a regeneration air path of the compressed air supply system. The first valve unit is therefore part of the regeneration air path. If in this case, both the first valve unit and the second valve unit are in their second switching state, an outflow of compressed air will be prevented solely because the discharge valve is kept closed by ventilation of the second control inlet.

A regeneration valve unit, which can be actuated via the first valve unit, may likewise be provided, the regeneration valve unit being arranged in a regeneration air path of the compressed air supply system. Such a regeneration valve unit may afford a favorable solution in terms of an adequate rate of flow of regeneration air. The presence of the regeneration valve unit may furthermore provide an extended switching circuit logic.

In this context, in particular, the regeneration valve unit may have a first control inlet, via which it can be pneumatically actuated by the first valve unit, and the regeneration valve unit may have a second control inlet, via which it can be pneumatically actuated by the second valve unit.

The second valve unit then evacuates the second control inlet of the regeneration valve unit in its first switching state and ventilates the second control inlet of the regeneration valve unit in its second switching state, and the regeneration valve unit is closed when the second control inlet is ventilated, even when the first control inlet is ventilated. That is to say if the two actuating valve units in such a regeneration valve unit incorporated into the circuit are both in their second switching state, both the discharge valve unit and the regeneration valve unit are closed.

In an especially preferred development of the invention, the second valve unit is coupled to a control line, which serves to perform further control functions in the compressed air supply system. Since most aspects of the functionality in terms of switching between the delivery operating state and the regeneration operating state are achieved in that the first valve unit switches whilst the second valve unit only has to keep the discharge valve closed in respect of the closing function when the compressor is idling, further functions, in particular further control functions of the compressed air supply system, can be assigned to the second valve unit.

For example, the control line may be connected to a control inlet of an overflow valve supplying a consumer circuit. The overflow valves, which supply the consumer circuits, are coordinated in respect of their opening and closing pressures in such a way that the individual consumer circuits are reciprocally safeguarded and that a predefined filling order is adhered to. Since the overflow valves are equipped with a control inlet, which is connected to the control line leading to the second valve unit, this makes it possible to influence the functions of the overflow valves that can be actuated in this way.

For example, by ventilating the control inlet it is possible to assist opening of the overflow valve. A consumer circuit of intrinsically low filling priority can thereby purposely be given filling preference. This may relate, in particular, to the compressed air circuit assigned to the pneumatic suspension system of the vehicle or to other circuits that can be filled without sacrificing safety in a state of the commercial vehicle, in which a sufficient braking action cannot yet be achieved. It is likewise possible to keep the overflow valves connected to the control line permanently open, so that closing is prevented when the pressure falls below the closing pressure.

According to another aspect, ventilation of the control inlet may serve to bring about and maintain a closed state of the overflow valve. This makes it possible, in particular, to separate a defective circuit from the other circuits, so that the compressed air system can continue to be operated in its optimum operating pressure range without losing compressed air via the defective circuit.

The valve units are usefully 3/2-way valves. This provides the connections and switching states required for the functions described.

An electronic control module may, in particular, be provided and the valve units may be solenoid valves. In this way, the various operating states of the compressed air supply system can be assumed on the basis of intelligent calculations, making it possible, in particular, to take a lot of data relating to the commercial vehicle into account. This data can be supplied directly to the electronic control module or via a data bus, it being possible to connect various other control modules of the commercial vehicle to a data bus, so as to exchange data with the control module of the compressed air supply system.

The discharge valve unit may furthermore be a 2/2-way valve. It is also useful for the regeneration valve unit to be a 2/2-way valve.

Since the functions of the discharge valve unit and the regeneration valve unit are linked by virtue of the parallel pressurization of their control inlets, according to a further embodiment, the discharge valve unit and the regeneration valve unit are integrated into a 4/2-way valve. Two connections of the 4/2-way valve serve for discharging compressed air, whilst the remaining connections are provided for the regeneration air path.

The method of operating the compressed air supply system has the first valve unit serving to control a first control inlet of the discharge valve unit, the energy-saving control outlet and the regeneration of the filter module, and the second valve unit serving to control a second control inlet of the discharge valve unit. In this way, the advantages and particular features of the compressed air supply system according to the invention are also embodied as a method. This also applies to the especially preferred embodiments of the method according to the invention specified below.

In a useful development of the method, the first valve unit evacuates the first control inlet of the discharge valve unit in a first switching state and ventilates the first control inlet of the discharge valve unit in a second switching state, and the discharge valve unit is brought into an opened state by ventilation of the first control inlet when the second control inlet is evacuated.

The second valve unit furthermore evacuates the second control inlet of the discharge valve unit in a first switching state and ventilates the second control inlet of the discharge valve unit in a second switching state, and the discharge valve unit is closed when the second control inlet is ventilated, even when the first control inlet is ventilated.

In an especially preferred embodiment of the invention, in a first operating state of the compressed air supply system, the first valve unit assumes its first switching state and the second valve unit assumes its first switching state, so that a first delivery operating state prevails.

Furthermore, in a second operating state of the compressed air supply system, the first valve unit assumes its first switching state and the second valve unit assumes its second switching state, so that a second delivery operating state prevails.

In a third operating state of the compressed air supply system, the first valve unit preferably assumes its second switching state and the second valve unit assumes its first switching state, so that a regeneration operating state prevails.

Furthermore, in a fourth operating state of the compressed air supply system, the first valve unit usefully assumes its second switching state and the second valve unit assumes its second switching state, so that a closed operating state prevails.

In one embodiment of the method according to the invention, the first valve unit is arranged in a regeneration air path of the compressed air supply system. A regeneration valve unit may likewise be actuated via the first valve unit, the regeneration valve unit being arranged in a regeneration air path of the compressed air supply system. In this case, the regeneration valve unit usefully has a first control inlet, via which it is pneumatically actuated by the first valve unit, and the regeneration valve unit has a second control inlet, via which it can be pneumatically actuated by the second valve unit.

In particular, the second valve unit evacuates the second control inlet of the regeneration valve unit in its first switching state and ventilates the second control inlet of the regeneration valve unit in its second switching state, and the regeneration valve unit is closed when the second control inlet is ventilated, even when the first control inlet is ventilated.

In an especially preferred embodiment of the present invention, the second valve unit is coupled to a control line, which serves to perform further control functions in the compressed air supply system. In this context it is particularly advantageous if the control line is connected to a control inlet of an overflow valve supplying a consumer circuit. According to one variant, opening of the overflow valve is assisted by ventilation of the control inlet.

In another method according to the invention, ventilation of the control inlet serves to bring about and maintain a closed state of the overflow valve. The valve units are usefully actuated by an electronic control module.

The invention is based on the finding that an unnecessary energy consumption due to the loss of compressed air can be avoided or prevented by an intelligent configuration of the regeneration and discharge system of the compressed air supply system. Here, the compressed air is retained in the system whenever possible. The outflow of compressed air is limited to periods when an outflow is unavoidable due to a necessary or desired regeneration of the filter module. The solution according to the invention provides independent control of the discharge valve unit and the energy-saving unit of the compressor, even though switching between the delivery phase and the regeneration phase can be brought about by the switching of a single valve unit. The discharge valve is opened only during the regeneration or in special flushing phases aimed at preventing a compressed air line from freezing up. The same valve unit as is used, at least in some embodiments of the present invention, for switching between the regeneration phase and the closed operating state may also serve to ensure an ongoing control of the compressed air supply system. In this case, a separate control inlet allows overflow valves to be controllably opened or kept open independently of their opening and closing pressures. Overflow valves can likewise be controllably closed or kept closed so as to permit the preferred filling of circuits which are connected to other overflow valves. In particular, this makes it possible, by closing the associated overflow valve and therefore isolating the defective circuit, to prevent any adverse effect on the compressed air supply system due to a circuit defect. Such a control over the sequences in the various consumer circuits can be performed on the basis of pressure data. In this case useful feedback and control concepts can be implemented via the control module, the compressed air supply system and other systems arranged in the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
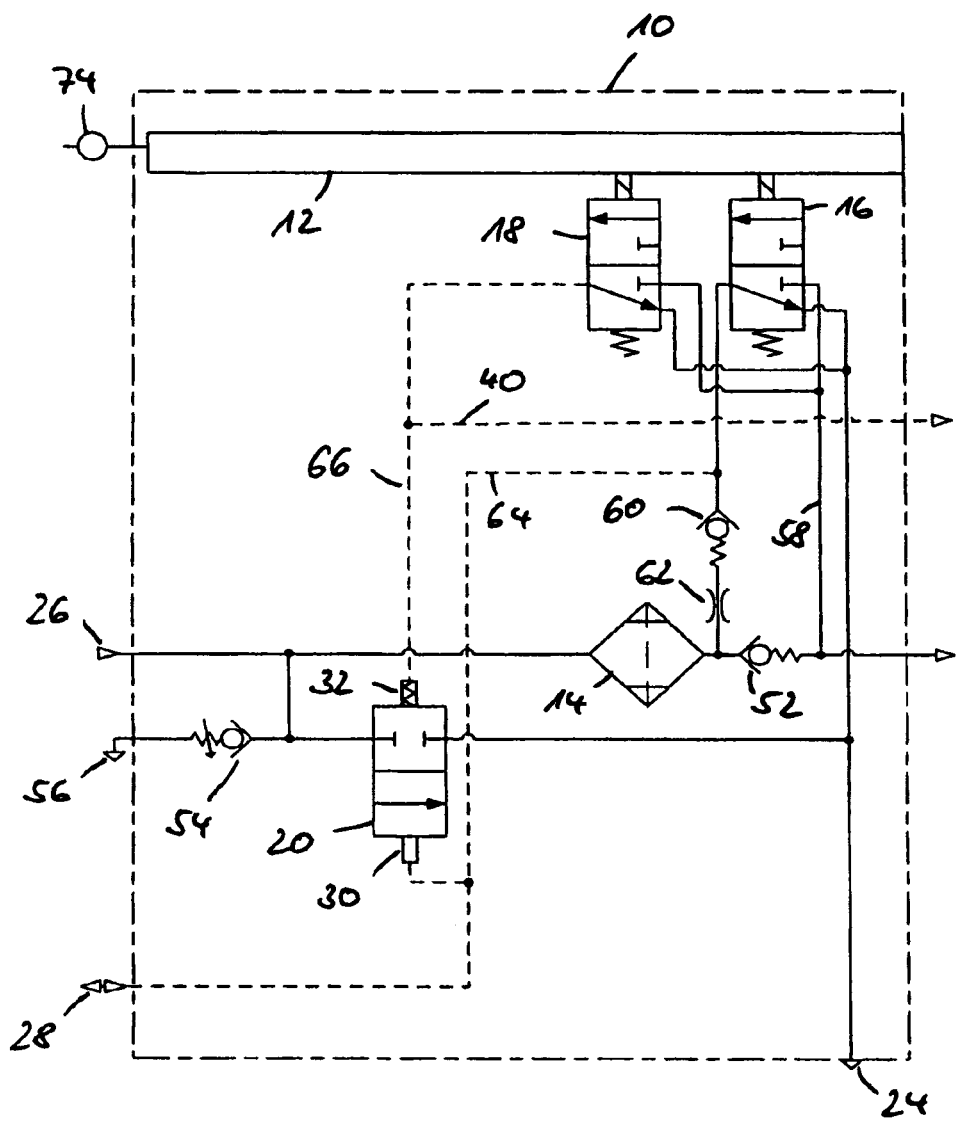
FIG. 1 is a schematic, partial representation of a first embodiment of a compressed air supply system according to the invention.

FIG. 1 shows a schematic, partial representation of a first embodiment of a compressed air supply system according to an embodiment of the invention. The compressed air supply system 10 includes an electronic control module 12. The control module 12 is equipped with an electrical interface 74 for the purposes of energy supply and signal exchange with other vehicle components. Two 3/2-way solenoid valves 16, 18 can be actuated by the electronic control module 12. Other components, such as a heating system, pressure sensors and further solenoid valves, for example, which may be provided in connection with the electronic control module 12, are not represented. The compressed air supply system has a compressed air inlet 26, which can be coupled to a compressor, and a discharge outlet 24. A discharge valve 20 is arranged between the compressed air inlet 26 and the discharge outlet 24. Also connected to the compressed air inlet 26 is a filter module 14. The compressed air delivered to the compressed air inlet 26 is fed to the consumer circuits via this filter module 14, a non-return valve 52, which prevents compressed air flowing back from the consumer circuits, also being provided on this path. The consumer circuits are generally supplied from the line, coupled to the non-return valve 52, via a multi-circuit safety valve unit (not shown here) incorporated into the compressed air supply system. The compressed air supply system 10 furthermore has an energy-saving control outlet 28, to which a control inlet of the compressor, which compressor is coupled to the compressed air inlet 26 and not shown here, can be connected. Also provided is an adjustable pressure relief valve 54, which is coupled to a discharge outlet 56. The pressure relief valve function may also be integrated into the discharge valve 20.

The first solenoid valve 16 is arranged in a bypass line 58, which bypasses the non-return valve 52, which intrinsically prevents compressed air flowing back from the consumer circuits to the filter module 14. With the solenoid valve 16 in a corresponding switching position, however, it is possible for compressed air to flow back through the bypass line 58, the solenoid valve 16 and an arrangement including a non-return valve 60 and a restrictor 62 and connected in series to the solenoid valve 16. Connected to the bypass line 58 is a control line 64, which serves to pressurize both the energy-saving control outlet 28 and a first control inlet 30 of the discharge valve 20. A second control inlet 32 of the discharge valve 20 is connected via a control line 66 to the second solenoid valve 18. The solenoid valve 18, like the solenoid valve 16, is supplied with compressed air from a point located downstream of the non-return valve 52. In the exemplary embodiment shown this point is situated immediately downstream of the non-return valve 52. It is also possible, however, for the supply to come from areas downstream of overflow valves, which are not shown here and are assigned to the consumer circuits (also not shown). Connected to the control line 66, which connects the solenoid valve 18 and the second control inlet 32 of the discharge valve 20, is a further control line 40, which serves for performing further control functions in the compressed air supply system.

In the non-energized state, the solenoid valves 16, 18 are situated in their switching states as shown, whilst they can be switched over by selective energizing in opposition to return forces.

If both solenoid valves 16, 18 are unenergized, the regeneration air path is closed by virtue of the switching position of the first solenoid valve 16, whereas the switching position of the second solenoid valve 18 means that the control inlets 30, 32 of the discharge valve and the energy-saving control outlet 28 are evacuated. A delivery operating state accordingly prevails, in which pressure is built-up in the compressed air supply system 10 and in the connected compressed air circuits. The stable position of the discharge valve 20 in its opened state is here achieved by a pre-tensioning force, which acts in the same direction as a force would act when the second control inlet 32 is ventilated.

If the second solenoid valve 18 is energized whilst the first solenoid valve 16 remains unenergized, the switching position of the discharge valve 20 does not alter in any way, since only the control inlet 32 is additionally ventilated, so that the discharge valve 20 is likewise driven into its closed position. A delivery operating state therefore likewise prevails.

If, on the other hand, the first solenoid valve 16 is energized whilst the second solenoid valve 18 remains in its unenergized state, this opens the regeneration air path. Furthermore, the energy-saving control outlet 28 and the first control inlet 30 of the discharge valve 20 are ventilated. Since the second control inlet 32 of the discharge valve 20 is evacuated, the discharge valve is switched over. Compressed air can therefore flow out via the bypass line 58 (in which the first solenoid valve 16, the non-return valve 60 and the restrictor 62 are arranged), the filter module 14, the discharge valve 20 and the discharge outlet 24.

If both solenoid valves 16, 18 are energized, although the regeneration air path is opened, the discharge valve 20 is closed. This is due to the fact that, given identical pressure on both control inlets 30, 32 of the discharge valve 20, the control inlet 32 has priority, due to an additional spring force and/or due also to corresponding balancing of the pressurized effective areas. The discharge valve 20 therefore blocks the outflow of compressed air despite the regeneration air path being opened. A closed operating state prevails.

Figure 2:
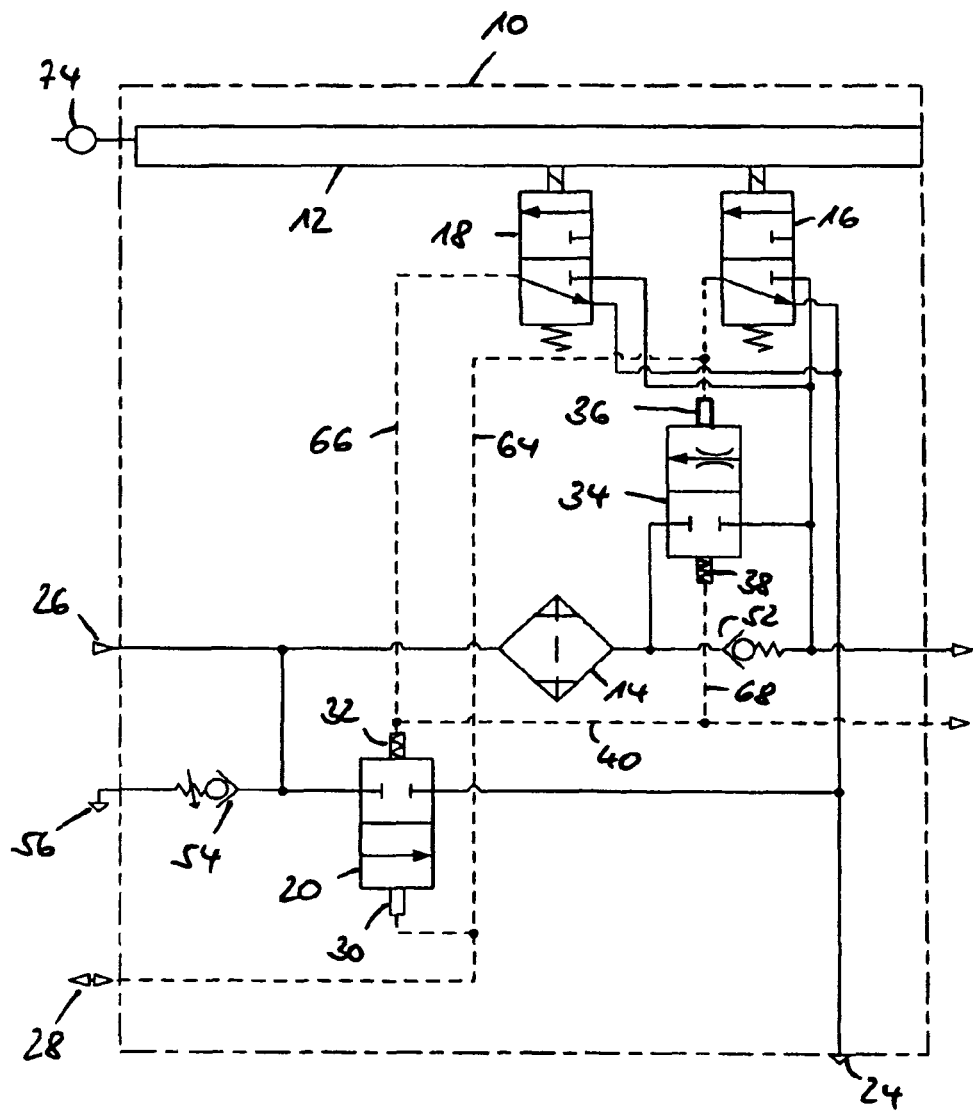
FIG. 2 is a schematic, partial representation of a second embodiment of a compressed air supply system according to the invention.

FIG. 2 shows a schematic, partial representation of a second embodiment of a compressed air supply system according to the invention. In contrast to FIG. 1, the valve unit 16 is now no longer arranged directly in the regeneration air path. Instead, a regeneration valve unit 34 is provided, which is configured as a 2/2-way valve and which when correspondingly actuated serves for regeneration purposes. Actuation is achieved via a first control inlet 36, which is coupled to the first solenoid valve 16, and a second control inlet 38, which is coupled to the second solenoid valve 18 via a control line 68.

In terms of the switching circuit logic, the first and second delivery operating state and the regeneration operating state of the arrangement according to FIG. 2 correspond to the states described in connection with FIG. 1. Only in the case in which both solenoid valves 16, 18 are energized does the switching circuit logic differ, since in that case both control inlets 36, 38 of the regeneration valve unit 34 are then ventilated. Since the second control inlet 38 has priority over the first control inlet 36, the regeneration air path is not opened. The closed operating state is therefore here characterized by a closed regeneration air path and a closed discharge valve 20. In the embodiment according to FIG. 2, therefore, the discharge valve unit 20 and the regeneration valve unit 34 are always either both closed or both opened.

Figure 3:
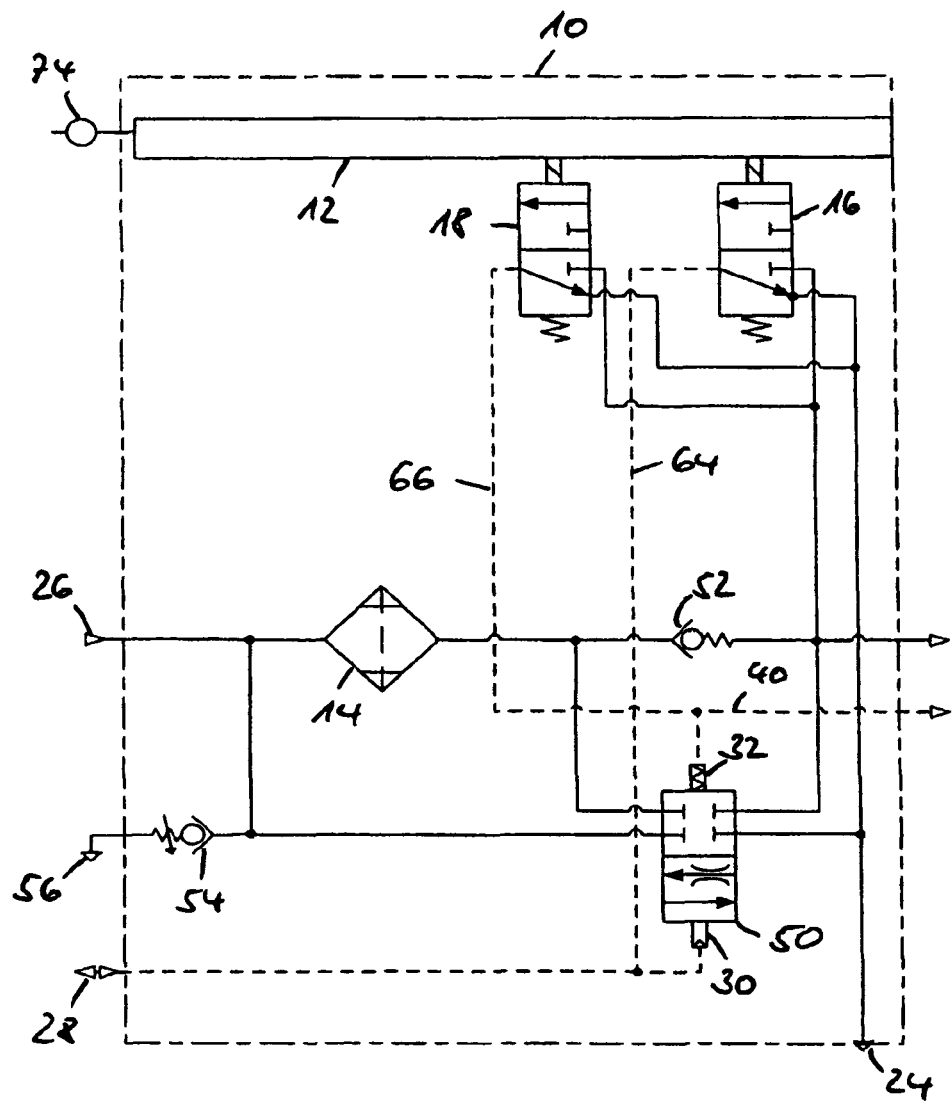
FIG. 3 is a schematic, partial representation of a third embodiment of a compressed air supply system according to the invention.

FIG. 3 shows a schematic, partial representation of a third embodiment of a compressed air supply system according to the invention. Here the principle of the concurrent operation of the discharge valve unit and the regeneration valve unit, which has already been described in connection with FIG. 2, is achieved in that the two valve units are integrated into a single discharge and regeneration valve unit 50, which is configured as a 4/2-way valve. Otherwise the embodiment according to FIG. 3 corresponds to that in FIG. 2.

Figure 4:
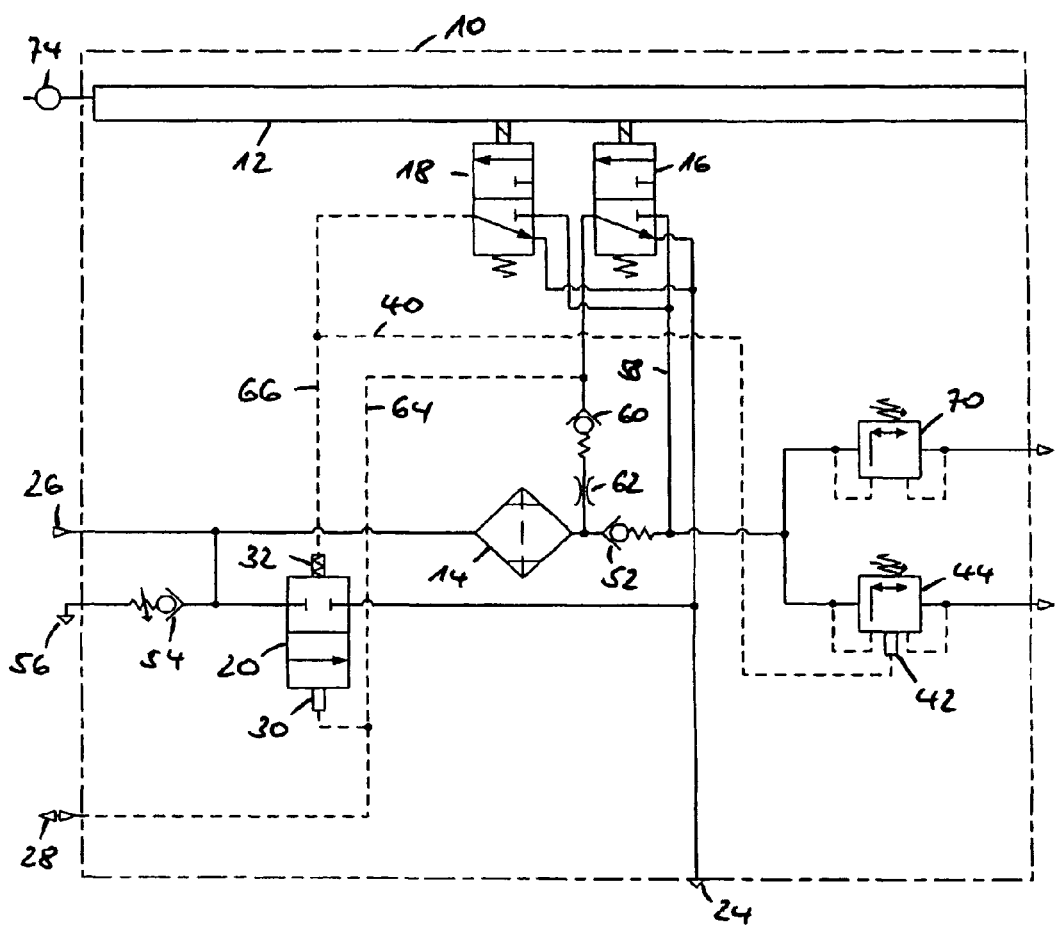
FIG. 4 is a schematic, partial representation of a fourth embodiment of a compressed air supply system according to the invention.

FIG. 4 shows a schematic, partial representation of a fourth embodiment of a compressed air supply system according to the invention. An extension of the embodiment according to FIG. 1 is shown, the particular features described below also possibly occurring in a similar extension of the embodiments according to FIG. 2 or 3. Two overflow valves 44, 70, via which various consumer circuits may be supplied with compressed air, are represented by way of example. These overflow valves 44, 70 have specific opening and closing pressures, so that a filling order is adhered to and the consumer circuits are mutually safeguarded. The overflow valve 44 additionally includes a control inlet 42, which is connected to the control line 40 leading to the second solenoid valve 18. If this control inlet 42 is ventilated, the overflow valve 44 is opened, or is kept in its opened state. Consequently, by switching over the solenoid valve 18 a consumer circuit can be filled irrespective of the pressure prevailing on the overflow valve 44.

Figure 5:
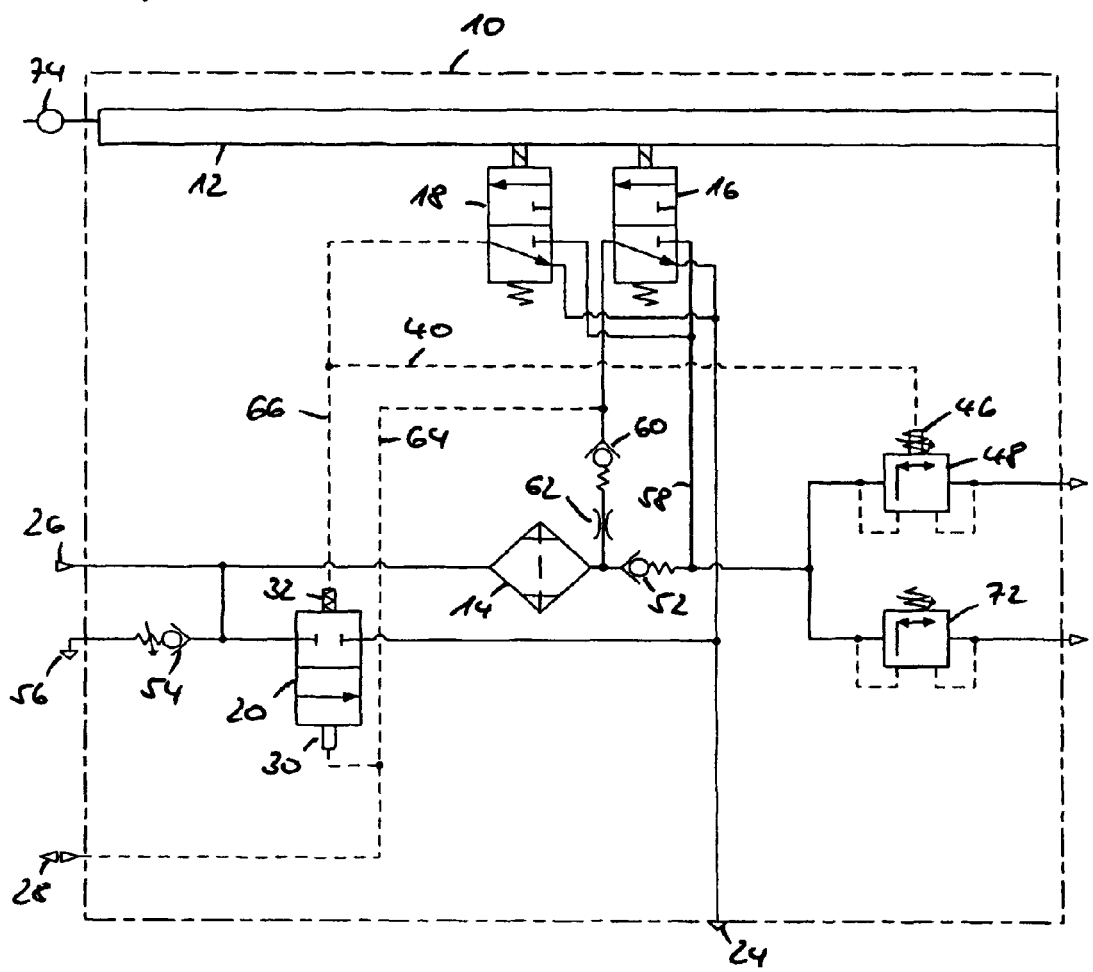
FIG. 5 is a schematic, partial representation of a fifth embodiment of a compressed air supply system according to the invention.

FIG. 5 shows a schematic, partial representation of a fifth embodiment of a compressed air supply system according to the invention. Here too, overflow valves 48, 72 are provided for supplying consumer circuits, the arrangement otherwise corresponding to that in FIG. 1. Again, a comparable arrangement may also be provided based on the arrangements according to FIGS. 2 and 3. In contrast to FIG. 4, closing of the overflow valve 48 is here assisted when ventilating a control inlet 46 assigned to the overflow valve 48. Through appropriate switching of the solenoid valve 18, the overflow valve 48 can therefore be kept closed. That is to say, priority may be given to filling the remaining consumer circuits, or the consumer circuit connected to the overflow valve 48 can be isolated from the remainder of the compressed air supply system and the other consumer circuits.

It should further be mentioned with regard to the embodiments of an inventive compressed air supply system represented in FIG. 2 that this is not necessarily limited to the configuration of the regeneration valve unit 34 shown. For example, it is possible to omit the control line 68 and the second control inlet 38 and to keep the regeneration valve unit 34 in the switching position shown by use of some return force. In the context of the embodiment described with reference to FIG. 2, the only difference that results is that in the closed operating state, that is to say the state in which both solenoid valves 16, 18 are energized, the regeneration air path is opened. The switching circuit logic would therefore correspond to that in FIG. 1.

TABLE OF REFERENCE NUMERALS 10 compressed air supply system
12 control module
14 filter module
16 valve unit
18 valve unit
20 discharge valve unit
24 discharge outlet
26 compressed air inlet
28 energy-saving control outlet
30 control inlet
32 control inlet
34 regeneration valve unit
36 control inlet
38 control inlet
40 control line
42 control inlet
44 overflow valve
46 control inlet
48 overflow valve
50 discharge and regeneration valve unit
52 non-return valve
54 pressure relief valve
56 discharge outlet
58 bypass line
60 non-return valve
62 restrictor
64 control line
66 control line
68 control line
70 overflow valve
72 overflow valve
74 interface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed air supply system for a commercial vehicle, comprising:
   a compressed air inlet coupleable to a compressor;
   a filter module coupled to the compressed air inlet via a delivery line;
   a discharge valve unit coupled to a discharge outlet and the delivery line;
   an energy-saving control outlet coupleable to a control inlet of the compressor;
   a first valve unit and a second valve unit, the first and second valve units being operatively configured to control the discharge valve unit, the energy-saving control outlet and a regeneration of the filter module; and
   wherein the first valve unit controls a first control inlet of the discharge valve unit, the energy-saving control outlet, and the regeneration of the filter module, and the second valve unit controls a second control inlet of the discharge valve unit.

2. The compressed air supply system as claimed in claim 1, wherein the first valve unit evacuates the first control inlet of the discharge valve unit in a first switching state and ventilates the first control inlet of the discharge valve unit in a second switching state, and wherein the discharge valve unit is brought into an opened state by ventilation of the first control inlet when the second control inlet is evacuated.

3. The compressed air supply system as claimed in claim 2, wherein the second valve unit evacuates the second control inlet of the discharge valve unit in a first switching state and ventilates the second control inlet of the discharge valve unit in a second switching state, and wherein the discharge valve unit is closed when the second control inlet is ventilated, even when the first control inlet is ventilated.

4. The compressed air supply system as claimed in claim 3, wherein, in a first operating state of the compressed air supply system, the first valve unit assumes its first switching state and the second valve unit assumes its first switching state, so that a first delivery operating state prevails.

5. The compressed air supply system as claimed in claim 4, wherein, in a second operating state of the compressed air supply system, the first valve unit assumes its first switching state and the second valve unit assumes its second switching state, so that a second delivery operating state prevails.

6. The compressed air supply system as claimed in claim 5, wherein, in that in a third operating state of the compressed air supply system, the first valve unit assumes its second switching state and the second valve unit assumes its first switching state, so that a regeneration operating state prevails.

7. The compressed air supply system as claimed in claim 6, wherein, in a fourth operating state of the compressed air supply system, the first valve unit assumes its second switching state and the second valve unit assumes its second switching state, so that a closed operating state prevails.

8. The compressed air supply system as claimed in claim 1, wherein the first valve unit is arranged in a regeneration air path of the compressed air supply system.

9. The compressed air supply system as claimed in claim 1, further comprising a regeneration valve unit, which is pneumatically actuatable via the first valve unit, the regeneration valve unit being arranged in a regeneration air path of the compressed air supply system.

10. The compressed air supply system as claimed in claim 9, wherein the regeneration valve unit has a first control inlet, via which the regeneration valve unit is pneumatically actuatable by the first valve unit, and a second control inlet, via which the regeneration valve unit is pneumatically actuatable by the second valve unit.

11. The compressed air supply system as claimed in claim 10, wherein the second valve unit evacuates the second control inlet of the regeneration valve unit in its first switching state and ventilates the second control inlet of the regeneration valve unit in its second switching state, and wherein the regeneration valve unit is closed when the second control inlet is ventilated, even when the first control inlet is ventilated.

12. The compressed air supply system as claimed in claim 9, wherein the regeneration valve unit is a 2/2-way valve.

13. A compressed air supply as claimed in claim 9, wherein the discharge valve unit and the regeneration valve unit are integrated into a 4/2-way valve.

14. The compressed air supply system as claimed in claim 1, wherein the second valve unit is coupled to a control line, which serves to perform further control functions in the compressed air supply system.

15. The compressed air supply system as claimed in claim 14, wherein the control line is connected to a control inlet of an overflow valve supplying a consumer circuit.

16. The compressed air supply system as claimed in claim 15, wherein opening of the overflow valve is assisted by ventilation of the control inlet.

17. The compressed air supply system as claimed in claim 15, wherein ventilation of the control inlet serves to bring about and maintain a closed state of the overflow valve.

18. The compressed air supply system as claimed in claim 1, wherein the first and second valve units are 3/2-way valves.

19. The compressed air supply system as claimed in claim 1, further comprising an electronic control module operably coupled with the first and second valve units, said valve units being solenoid valves.

20. The compressed air supply system as claimed in claim 1, wherein the discharge valve unit is a 2/2-way valve.

21. A method for operating a compressed air supply system having a compressed air inlet coupleable to a compressor, a filter module coupled to the compressed air inlet via a delivery line, a discharge valve unit coupled to a discharge outlet and the delivery line, an energy-saving control outlet coupleable to a control inlet of the compressor, and first and second valve units, the method comprising the acts of:
controlling, via the first valve unit, a first control inlet of the discharge valve unit, the energy-saving control outlet coupled to the control inlet of the compressor, and a regeneration of the filter module; and
controlling, via the second valve unit, a second control inlet of the discharge valve unit.

22. The method as claimed in claim 21, wherein the first valve unit evacuates the first control inlet of the discharge valve unit in a first switching state and ventilates the first control inlet of the discharge valve unit in a second switching state, and wherein the discharge valve unit is brought into an opened state by ventilation of the first control inlet when the second control inlet is evacuated.

23. The method as claimed in claim 22, wherein the second valve unit evacuates the second control inlet of the discharge valve unit in a first switching state and ventilates the second control inlet of the discharge valve unit in a second switching state, and wherein the discharge valve unit is closed when the second control inlet is ventilated, even when the first control inlet is ventilated.

24. The method as claimed in claim 23, wherein, a first operating state of the compressed air supply system, the first valve unit assumes its first switching state and the second valve unit assumes its first switching state, so that a first delivery operating state prevails.

25. The method as claimed in claim 24, wherein, in a second operating state of the compressed air supply system, the first valve unit assumes its first switching state and the second valve unit assumes its second switching state, so that a second delivery operating state prevails.

26. The method as claimed in claim 25, wherein, in a third operating state of the compressed air supply system, the first valve unit assumes its second switching state and the second valve unit assumes its first switching state, so that a regeneration operating state prevails.

27. The method as claimed in claim 26, wherein, in a fourth operating state of the compressed air supply system, the first valve unit assumes its second switching state and the second valve unit assumes its second switching state, so that a closed operating state prevails.

28. The method as claimed in claim 21, wherein the first valve unit is arranged in a regeneration air path of the compressed air supply system.

29. The method as claimed in claim 21, wherein a regeneration valve unit is pneumatically actuated via the first valve unit, the regeneration valve unit being arranged in a regeneration air path of the compressed air supply system.

30. The method as claimed in claim 29, wherein the regeneration valve unit has a first control inlet, via which it can be pneumatically actuated by the first valve unit, and wherein the regeneration valve unit has a second control inlet via which it can be pneumatically actuated by the second valve unit.

31. The method as claimed in claim 30, wherein the second valve unit evacuates the second control inlet of the regeneration valve unit in its first switching state and ventilates the second control inlet of the regeneration valve unit in its second switching state, and wherein the regeneration valve unit is closed when the second control inlet is ventilated, even when the first control inlet is ventilated.

32. The method as claimed in claim 21, wherein the second valve unit is coupled to a control line, which serves to perform further control functions in the compressed air supply system.

33. The method as claimed in claim 32, wherein the control line is connected to a control inlet of an overflow valve supplying a consumer circuit.

34. The method as claimed in claim 33, wherein opening of the overflow valve is assisted by ventilation of the control inlet.

35. The method as claimed in claim 33, wherein ventilation of the control inlet serves to bring about and maintain a closed state of the overflow valve.

36. The method as claimed in claim 21, wherein the valve units are actuated by an electronic control module.

\* \* \* \* \*